(12) United States Patent
Kallas

(10) Patent No.: US 6,942,562 B2
(45) Date of Patent: Sep. 13, 2005

(54) FISH CLEANING DEVICE

(76) Inventor: James T. Kallas, 5650 Fairland Rd., Clinton, OH (US) 44216

( * ) Notice: Subject to any disclaimer, the term of this patent is extended or adjusted under 35 U.S.C. 154(b) by 9 days.

(21) Appl. No.: 10/734,884

(22) Filed: Dec. 15, 2003

(65) Prior Publication Data

US 2005/0130575 A1    Jun. 16, 2005

(51) Int. Cl.[7] .............................................. A22C 25/08
(52) U.S. Cl. ...................................................... 452/195
(58) Field of Search ............................... 452/194–197, 452/185, 102–105; 248/121, 122.1, 126, 248/176.1, 229.1, 229

(56) References Cited

U.S. PATENT DOCUMENTS

| | | | |
|---|---|---|---|
| 2,725,592 A | 12/1955 | Pieper | 17/8 |
| 2,756,457 A * | 7/1956 | Banowetz, Sr. | 452/195 |
| 2,795,814 A | 6/1957 | Gaultney | 17/8 |
| 3,177,523 A * | 4/1965 | Andersen | 452/195 |
| 3,248,751 A * | 5/1966 | Wilborn | 452/195 |
| 3,503,094 A * | 3/1970 | Kennedy | 452/195 |
| 3,713,188 A * | 1/1973 | Holladay | 452/196 |
| 3,753,270 A * | 8/1973 | Hellebusch | 452/195 |
| 3,908,231 A * | 9/1975 | Price et al. | 452/195 |
| 4,454,630 A | 6/1984 | Shouldis | 25/6 |
| 4,531,260 A | 7/1985 | Klamm | 452/195 |
| 5,116,279 A * | 5/1992 | Perry | 452/195 |
| D352,427 S | 11/1994 | Burd | D7/698 |
| 6,117,004 A * | 9/2000 | Fure | 452/196 |

* cited by examiner

*Primary Examiner*—Thomas Price
(74) *Attorney, Agent, or Firm*—Renner, Kenner, Greive, Bobak, Taylor & Weber

(57) ABSTRACT

A fish cleaning device includes a base having an upper surface and a lower surface, one or more arms, each having a first and second end. The first end of the arm is pivotally attached to the base. A clamp-securing member is pivotally attached to the second arm end and a clamp is attached to the clamp-securing member. The device allows for the cleaning of both sides of a fish with decreased handling of the fish. The device is used by securing the fish to the clamp, cleaning one side of the fish, pivoting the arms relative to the base, thereby flipping the fish, and cleaning the second side of the fish.

13 Claims, 3 Drawing Sheets

US 6,942,562 B2

FISH CLEANING DEVICE

FIELD OF THE INVENTION

The present invention relates to a device to assist in the cleaning of fish. More particularly, this invention relates to a fish cleaning and filleting board. Specifically, this invention relates to a fish cleaning or filleting device that minimizes the amount of handling of fish being cleaned by providing a clamp secured to at least one pivoting arm.

BACKGROUND OF THE INVENTION

Fishing is widely recognized as a generally enjoyable recreational activity. One of the less enjoyable aspects of fishing, however, is the cleaning of fish that are caught. The cleaning of fish generally includes scaling the fish or, in the case of some species such as catfish, skinning the fish, and removing the head, tail and fins of the fish. If the fish is of sufficient size, the fish may be filleted, that is, the edible portion of the fish may be removed from the bones. However, cleaning fish can be difficult due to the fact that fish are generally slippery and difficult to grasp. Removed fish scales and associated material will inevitably be spread onto knifes or other instruments during cleaning, making the instruments difficult to handle, further increasing the difficulty and unpleasantness of the task.

A wide variety of devices are known in the art to facilitate fish cleaning. These devices are known as fish cleaning boards, fish scaling boards, fish filleting kits, etc., and typically contain a clamp permanently affixed to a cutting or cleaning board. Examples of these devices include those described in U.S. Pat. Nos. 2,725,592, 2,756,457, 3,503,094, and Des. 352,427, the disclosures of which are hereby incorporated by reference herein. However, the use of a clamp fixed to a base still requires an unacceptable amount of handling of the fish. With such apparatuses, the fish is typically secured by the clamp and one side of the fish is cleaned. The fish is then removed from the clamp, turned over, reclamped and the second side cleaned. During unclamping and reclamping of the fish, the fish must be handled, spreading scales and fluids onto the hands.

Another apparatus has attempted to minimize the amount of handling during cleaning by clamping a fish in the middle of a base and providing a means to flip the fish from one side of the board to the other without touching the fish. One such device includes the kit disclosed in U.S. Pat. No. 5,116,279, the disclosure of which is also incorporated by reference herein. However, this kit still includes a clamp permanently affixed to the cleaning surface. Also, the kit only allows the clamping of the tail of the fish. This minimizes the usefulness of the kit, since clamping the head of the fish may be preferred depending on the size of the fish and the cleaning technique used.

Another fish cleaning apparatus is disclosed in U.S. Pat. No. 6,117,004, the disclosure of which is also incorporated by reference herein. The apparatus requires the impaling of a fish to be cleaned on a holder rod and securing of the fish on one of a pair of angularly oriented cleaning surfaces by a plurality of spikes protruding from the cleaning surfaces. While the apparatus allows each side of the fish to be cleaned without handling the fish to turn it over during cleaning, it does not permit the securing of either the head or the tail of the fish, limiting its usefulness as mentioned above. The apparatus also requires two separate cleaning surfaces. It also impales the flesh of the fish on the spikes protruding from the surface, potentially causing the flesh of the fish to be damaged, reducing the attractiveness of the cleaned fish.

Therefore there is still a need for a fish cleaning device that minimizes the amount of handling of the fish being cleaned, while permitting either the head or tail of the fish to be secured.

BRIEF SUMMARY OF THE INVENTION

It is, therefore, an aspect of the present invention to provide a fish cleaning device that permits user to turn a fish from one side to another without touching the fish.

It is another aspect of the present invention to provide a method of cleaning a fish that does not include physically touching a fish between cleaning one side and cleaning the other side of the fish.

It is still another aspect of the present invention to provide a fish cleaning apparatus that allows either the head or the tail of the fish to be secured.

It is yet another aspect of the present invention to provide a fish cleaning apparatus that includes a clamp that pivots from one position to another.

At least one or more of the foregoing aspects, together with the advantages thereof over the known art relating to fish cleaning, which shall become apparent from the specification which follows, are accomplished by the invention as herein after described and claimed.

In general, the present invention provides a fish cleaning device comprising a base having an upper surface and a lower surface, one or more arms, each having a first and second end, wherein the first end is pivotally attached to the base, a clamp-securing member, pivotally attached to the second arm end, and a clamp, attached to the clamp-securing member. Typically, two arms may be used, with each arm being attached to an opposing side of the base. The arms may be pivotally attached to the base at approximately the mid-point of the length of the base. The device may also contain one or more legs extending from the lower surface of the base. The upper surface of the base may also contain a textured surface such as indented grooves or raised ribs or both to increase the friction of the fish on the base or to collect liquid produced during cleaning of the fish or both.

The present invention also provides a method of cleaning fish. The method includes providing a fish cleaning device, the device comprising a base having an upper surface and a lower surface, one or more arms, each arm having a first and second end, wherein each of the first ends is pivotally attached to the base and a clamp-securing member is pivotally attached to the second arm end, and a clamp is attached to the clamp-securing member. The method further includes securing a fish to the clamp, positioning the arms such that the fish lies flat on the upper surface of the base, cleaning one side of the fish, pivoting the arms relative to the base, such that the fish is flipped and the cleaned side of the fish rests on the upper surface of the base, and cleaning the second side of the fish. The method may additionally include the steps of gutting the fish and removing the head and tail of the fish. The method may be used to scale, skin, or fillet the fish.

DETAILED DESCRIPTION OF THE INVENTION

Figure 1:
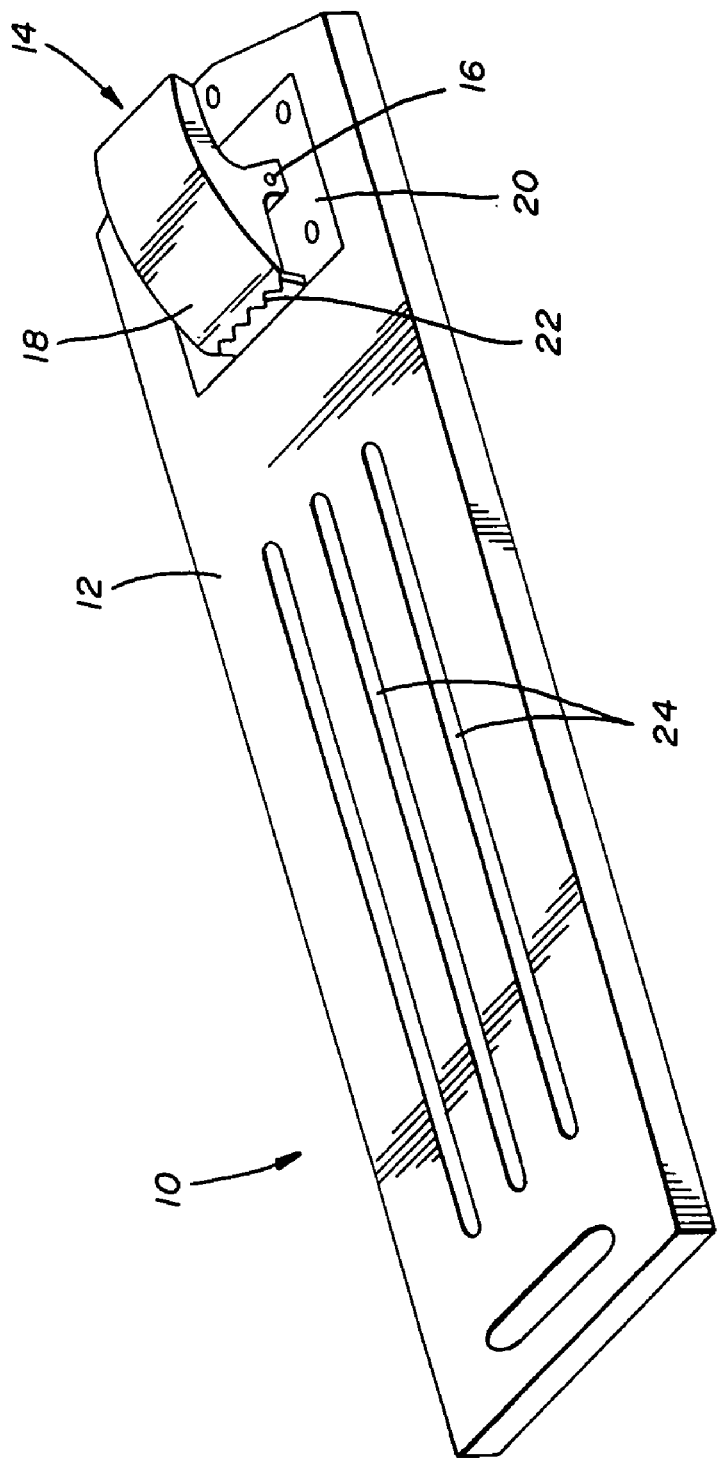
FIG. 1 is a drawing showing a typical fish cleaning apparatus according to the prior art.

A fish cleaning device according to the prior art is illustrated in FIG. 1. The device 10 has a base 12 and a clamp 14 permanently attached to base 12. Clamp 14 contains a spring loaded pivot 16 that allows an upper plate 18 and a lower plate 20 of clamp 14 to be biased toward a closed position. Clamp 14 may also include interlocking teeth 22 attached to upper plate 18 and lower plate 20. Base 12 may also include one or more grooves 24 in the upper surface of base 12 to allow water or other fluids to be separated from the fish during cleaning and to decrease the chance of the fish moving during cleaning. Alternatively, one or more raised ribs or ridges (not shown) may be used to elevate the fish from the surface of the base for the same purpose. In use, the head or tail of a fish is placed in clamp 14 and one side of the fish is scaled, skinned or filleted. The fish is then removed from clamp 14, turned over, re-secured in clamp 14, and the second side of the fish is scaled, skinned, or filleted.

Figure 2:
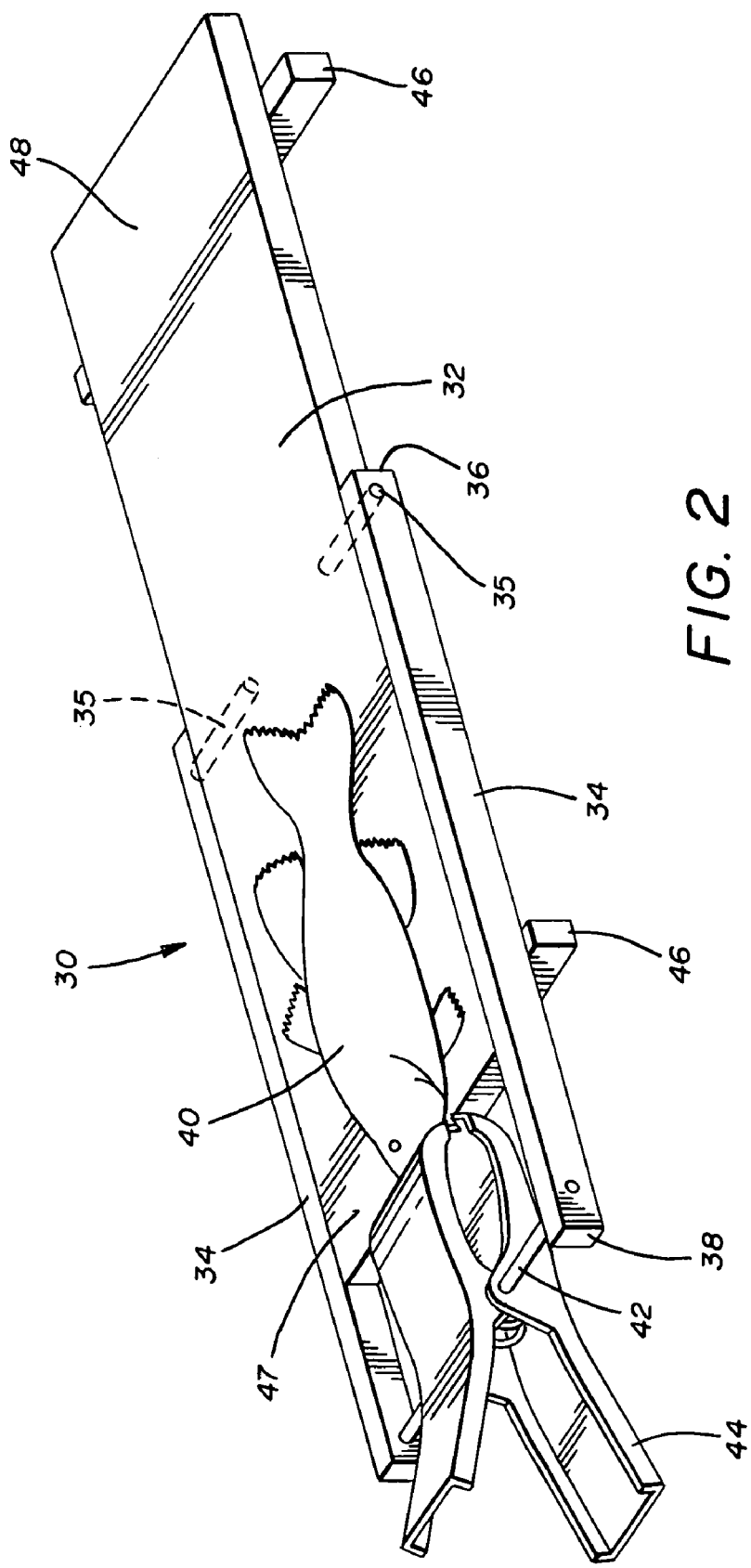
FIG. 2 is a perspective view of the device of the present invention with a fish secured in the clamp, presenting a first side of the fish.
Figure 3:
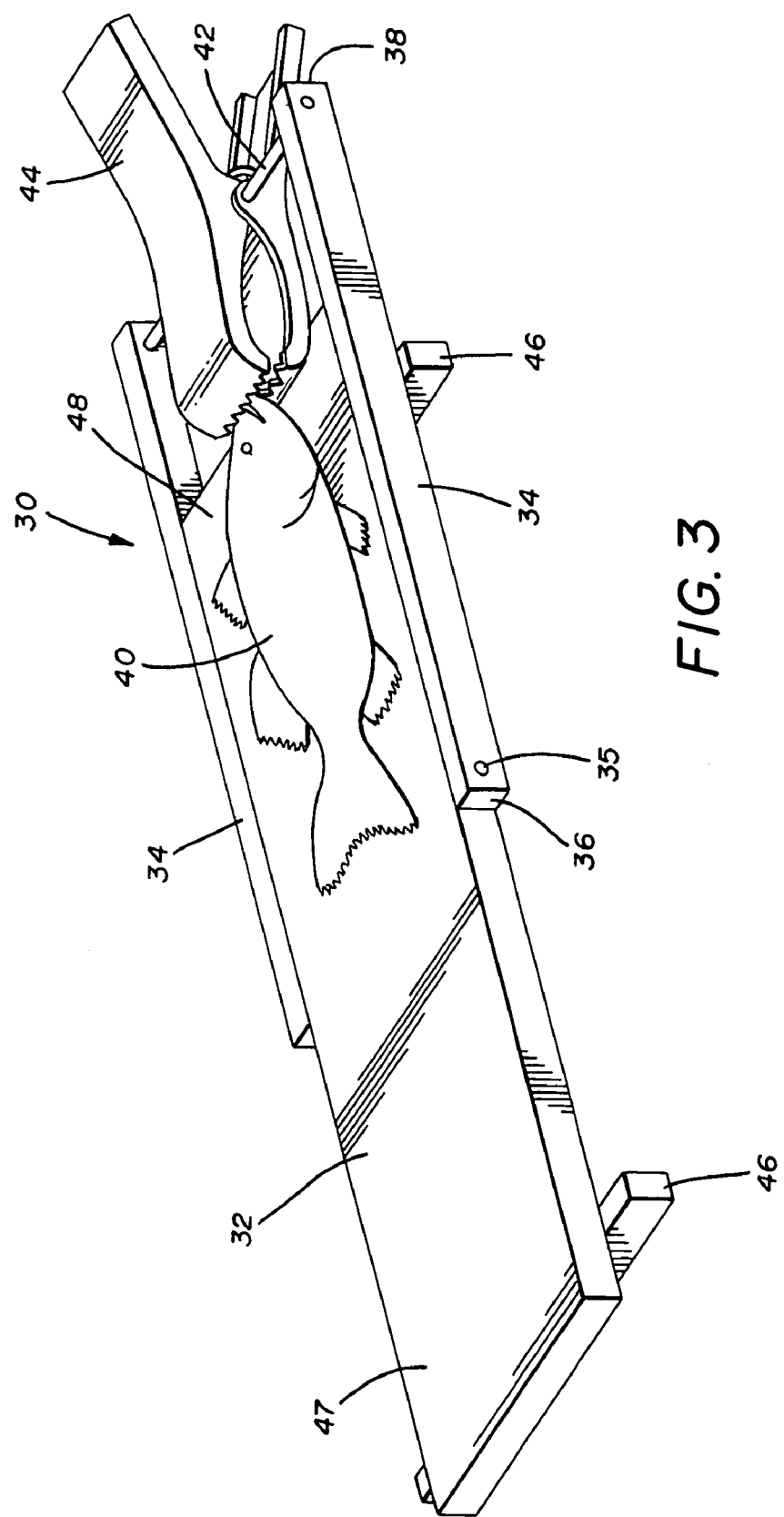
FIG. 3 is a perspective view of the device of the present invention with a fish secured in the clamp, presenting a second side of the fish.

The device of the present invention is shown in use in FIGS. 2 and 3. The fish cleaning device 30 includes a base 32, on which a fish 40 is placed. Pivotally attached to base 32 at the side of base 32 is one or more arms 34 having a first end 36 and a second end 38. Arm 34 is preferably attached at or near the mid point of the length of base 32 near first end 36 by a pivot 35, such that arm 34 is capable of being positioned next to either end of base 32. It is also preferred that two arms 34 be used, with one arm positioned on each side of base 32 along its length. Pivotally attached near second end 38 of arm 34 is a clamp-securing member 42. A clamp 44 is secured to clamp-securing member 42. Clamp 44 may be a two piece clamp with a torsion spring attaching the two clamp pieces, and clamp-securing member 42 may be a pivot rod inserted through the torsion spring of clamp 44. Additionally, one or more legs 46 may extend from the lower surface of base 32. These legs may extend laterally beyond the edge of base 32 and provide a limit to the travel of arms 34 on pivot 35, so that arms 34 may travel between a position parallel to base 32 at a first end 47 of base 32 and parallel to base 32 at a second end 48 of base 32. Arms 34 may deviate from being completely parallel to base 32 by a few degrees where the thickness of a fish 40 secured by clamp 44 prevents full travel of arms 34 to an entirely parallel position. Preferably, arms 34 are within 10 degrees of parallel to base 32, and more preferably within 5 degrees of parallel. In one particular embodiment, arms 34 are parallel to base 32. It should be understood, however, that the position of arms 34 may be described as being parallel to base 32, but that this includes an essentially parallel position, i.e., one where the width of the fish prevents the arms from assuming a fully parallel position. The position of arms 34 is not critical to the functioning of device 30, provided that fish 40 is capable of lying flat on base 32.

In use, a fish 40 is secured to device 30 by clamping its head or tail in clamp 44, such that fish 40 is capable of lying flat on base 32 at the first end 47 of base 32, as shown in FIG. 2. With fish 40 secured, the fish is typically gutted and one side of fish 40 is cleaned. This may include scaling the fish and removing the fins, or filleting the fish. Some species of fish, such as catfish, may be skinned rather than scaled. When one side is cleaned, arms 34 are raised at second end 38 of arms 34 and pivoted at pivot 35 until arms 34 are positioned at the opposite end 48 of base 32, as shown in FIG. 3. This presents the second side of fish 40 for cleaning without handling the fish or providing the opportunity for the fish to slip from the user's grasp. When the second side of the fish is scaled, the head and tail are typically removed from the edible portion of the fish and discarded. If the fish is filleted, removal of the head and tail is not necessary.

Based upon the foregoing disclosure, it should now be apparent that the fish cleaning device of the present invention will carry out the objects set forth hereinabove. It is, therefore, to be understood that any variations evident fall within the scope of the claimed invention and thus, the selection of specific component elements can be determined without departing from the spirit of the invention herein disclosed and described.

I claim:

1. A fish cleaning device comprising:
   a base having an upper surface and a lower surface;
   one or more arms, each having a first and second end, wherein the first end is pivotally attached to said base;
   a clamp-securing member carried near said second arm end; and
   a clamp carried by said clamp-securing member, said clamp being pivotable relative to said one or more arms.

2. The device of claim 1, wherein said one or more arms are pivotally attached to said base at approximately the mid-point of the length of the base.

3. The device of claim 1, wherein the device comprises two arms, attached to opposing sides of said base.

4. The device of claim 1, additionally comprising one or more legs extending from the lower surface of said base.

5. The device of claim 4, wherein the one or more legs extend laterally from the base to provide a limit to the travel of the one or more arms.

6. The device of claim 1, wherein said upper surface of said base contains a textured surface selected from the group consisting of raised ribs and indented grooves.

7. A method of cleaning a fish, said method comprising:
   a) providing a fish cleaning device, said device comprising a base having an upper surface and a lower surface, one or more arms, each arm having a first and second end, wherein each of said first ends is pivotally attached to said base, a clamp-securing member carried by said second arm end, and a clamp carried by said clamp-securing member;
   b) securing a fish to the clamp;
   c) positioning the one or more arms such that said arms are adjacent to the base at a first end such that said fish lies flat on the upper surface of said base;
   d) cleaning a first side of the fish;
   e) pivoting said one or more arms relative to said base with the fish still secured to the clamp to flip the fish so that the first side of the fish rests on the upper surface of the base; and
   f) cleaning a second side of the fish.

8. The method according to claim 7, additionally comprising the steps of and gutting the fish and removing the head and tail of the fish.

9. The method according to claim 7, wherein the step of cleaning a first side of the fish and the step of cleaning a second side of the fish are each at least one procedure selected from the group consisting of scaling the fish, skinning the fish, and filleting the fish.

10. The method according to claim 7, wherein the step of cleaning a first side of the fish and the step of cleaning a second side of the fish are each filleting the fish.

11. The method according to claim 7, wherein the step of securing a fish to the clamp comprises clamping the head of the fish.

12. The method according to claim 7, wherein the step of securing a fish to the clamp comprises clamping the tail of the fish.

13. A fish cleaning device comprising a base, a pair of spaced arms pivotally attached to said base, a clamp-securing member extending between said arms, and a clamp carried by said member and being pivotable relative to said arms.

* * * * *